United States Patent
Iba

(10) Patent No.: US 12,523,875 B2
(45) Date of Patent: Jan. 13, 2026

(54) WIDE-FIELD VIDEO DISPLAY APPARATUS

(71) Applicant: Kopin Corporation, Westborough, MA (US)

(72) Inventor: Yoichi Iba, Tokyo (JP)

(73) Assignee: KOPIN CORPORATION, Westborough, MA (US)

( * ) Notice: Subject to any disclaimer, the term of this patent is extended or adjusted under 35 U.S.C. 154(b) by 324 days.

(21) Appl. No.: 18/021,975

(22) PCT Filed: Aug. 21, 2020

(86) PCT No.: PCT/JP2020/031665
§ 371 (c)(1),
(2) Date: Feb. 17, 2023

(87) PCT Pub. No.: WO2022/038777
PCT Pub. Date: Feb. 24, 2022

(65) Prior Publication Data
US 2023/0359033 A1 Nov. 9, 2023

(51) Int. Cl.
*G02B 27/01* (2006.01)
*G02B 3/04* (2006.01)
(Continued)

(52) U.S. Cl.
CPC ........... *G02B 27/0172* (2013.01); *G02B 3/04* (2013.01); *G02B 5/3033* (2013.01); *G02B 7/021* (2013.01);
(Continued)

(58) Field of Classification Search
CPC ...... G02B 27/0172; G02B 27/02; G02B 3/04; G02B 5/3033; G02B 5/30; G02B 7/021;
(Continued)

(56) References Cited

U.S. PATENT DOCUMENTS 11,181,731 B1 * 11/2021 Bumgardner ............ G02B 3/04
11,314,097 B2 * 4/2022 Ouderkirk ............ G02B 5/3025
(Continued)

FOREIGN PATENT DOCUMENTS

CN 109507801 A 3/2019
JP 2019-53152 A 4/2019
(Continued)

OTHER PUBLICATIONS

Toyohiko Hatada et al., "Induced Effect of Direction Sensation and Display Size", The Journal of the Institute of Television Engineers of Japan vol. 33, No. 5, pp. 407-413 (1979), with English Abstract.
(Continued)

*Primary Examiner* — William R Alexander
(74) *Attorney, Agent, or Firm* — PELOQUIN, PLLC; Mark S. Peloquin, Esq.

(57) ABSTRACT

A look-in type wide-field video display apparatus includes an ocular optical system (OC), a circular polarizing plate, and a display device (D) positioned in order from a user's eye side. The OC includes a first lens (L1) and a second lens (L2) positioned in order from the user's eye side, a surface on the user's eye side in the L1 is aspherical, a surface on a D side in the L1 is planar or approximately planar, and a reflective polarizing plate and a ¼-wavelength plate are laminated on the surface on the D side in this order from the user's eye side, a surface on the user's eye side in the L2 is aspherical, and is convex toward the user's eye side around an optical axis of the OC or is approximately planar, and a surface on the D side in the L2 is aspherical convex toward the D side.

12 Claims, 16 Drawing Sheets

(51) Int. Cl.
  *G02B 5/30* (2006.01)
  *G02B 7/02* (2021.01)
(52) U.S. Cl.
  CPC ........... *G02B 2027/0123* (2013.01); *G02B 2027/0185* (2013.01)
(58) Field of Classification Search
  CPC .... G02B 2027/0123; G02B 2027/0185; H04N 5/64
  USPC ........................................................ 359/630
  See application file for complete search history.

(56) References Cited

U.S. PATENT DOCUMENTS

| | | | | |
|---|---|---|---|---|
| 2017/0068100 | A1* | 3/2017 | Ouderkirk | B29D 11/0073 |
| 2017/0097508 | A1* | 4/2017 | Yun | G02B 27/0983 |
| 2018/0088313 | A1* | 3/2018 | Jhang | G02B 9/10 |
| 2018/0088314 | A1* | 3/2018 | Jhang | G02B 9/10 |
| 2018/0239149 | A1* | 8/2018 | Yun | G03B 21/28 |
| 2019/0079234 | A1 | 3/2019 | Takagi et al. | |
| 2019/0258047 | A1* | 8/2019 | Jhang | G02B 3/08 |
| 2019/0265467 | A1* | 8/2019 | Yun | G02B 17/0856 |
| 2019/0384045 | A1 | 12/2019 | Yun et al. | |
| 2020/0053350 | A1 | 2/2020 | Hudman | |
| 2020/0064592 | A1* | 2/2020 | Tashiro | G02B 27/0075 |
| 2020/0081234 | A1 | 3/2020 | Etter et al. | |
| 2020/0096780 | A1* | 3/2020 | Ouderkirk | G02B 17/0856 |
| 2020/0192079 | A1 | 6/2020 | Tohara et al. | |
| 2021/0373318 | A1* | 12/2021 | Jhang | G02B 25/001 |

FOREIGN PATENT DOCUMENTS

| | | | |
|---|---|---|---|
| JP | 2020-510238 | A | 4/2020 |
| JP | 2020-95205 | A | 6/2020 |
| JP | 2020-519964 | A | 7/2020 |

OTHER PUBLICATIONS

International Search Report issued in International Bureau of WIPO Patent Application No. PCT/JP2020/031665, dated Nov. 10, 2020, along with an English translation thereof.
Office Action in Patent Office of China SN202080103333.0, Mar. 24, 2025 (6 pages).

* cited by examiner

| SERIAL NUMBER | SURFACE | TYPE | CURVATURE RADIUS (mm) | THICKNESS (mm) | Nd, Vd OF MATERIAL | EFFECTIVE DIAMETER (mm) |
|---|---|---|---|---|---|---|
| 0 | VIRTUAL IMAGE PROJECTED BY OC | PLANE | INFINITY | -1,015.000 | | |
| 1 | S0 | PLANE | INFINITY | 15.000 | | 8.0 |
| 2 | L1 S1 | ASPHERICAL SURFACE | 103.901 | 3.737 | 1.6355, 23.97 | 34.0 |
| 3 | L1 S2, RP (L1 SIDE) | PLANE | INFINITY | 0.300 | 1.4917, 57.44 | 40.4 |
| 4 | JOINING SURFACE OF RP AND QW | PLANE | INFINITY | 0.300 | 1.4917, 57.44 | 40.4 |
| 5 | QWP (L2 SIDE) | PLANE | INFINITY | 0.288 | | 40.4 |
| 6 | L2 S3 | ASPHERICAL SURFACE | 37.534 | 8.983 | 1.4940, 57.08 | 45.0 |
| 7 | L2 S4 | ASPHERICAL SURFACE | -94.510 | -8.983 | MIRROR | 45.0 |
| 8 | L2 S3 | ASPHERICAL SURFACE | 37.534 | -0.288 | | 45.0 |
| 9 | QWP (L2 SIDE) | PLANE | INFINITY | -0.300 | 1.4917, 57.44 | 40.4 |
| 10 | JOINING SURFACE OF RP AND QWP | PLANE | INFINITY | 0.300 | MIRROR | 40.4 |
| 11 | QWP (L2 SIDE) | PLANE | INFINITY | 0.288 | | 40.4 |
| 12 | L2 S3 | ASPHERICAL SURFACE | 37.534 | 8.983 | 1.4940, 57.08 | 45.0 |
| 13 | L2 S4 | ASPHERICAL SURFACE | -94.510 | 1.696 | | 45.0 |
| 14 | CP (OC SIDE) | PLANE | INFINITY | 0.281 | 1.4917, 57.44 | 30.0 |
| 15 | JOINING SURFACE OF CP AND D | PLANE | INFINITY | 0.700 | 1.5168, 64.16 | 30.0 |
| 16 | INTERFACE BETWEEN D1 AND S5 | PLANE | INFINITY | 0.000 | | 23.0 |
| 17 | S5 | PLANE | INFINITY | 0.000 | | 23.0 |

FIG. 5

|    | k         | a         | b          | c          | d          | e         |
|----|-----------|-----------|------------|------------|------------|-----------|
| S1 | 0.000E+00 | 0.000E+00 | -4.941E-06 | -2.008E-08 | -6.785E-11 | 0.000E+00 |
| S3 | 0.000E+00 | 0.000E+00 | -4.515E-05 | 7.121E-08  | -4.439E-11 | 0.000E+00 |
| S4 | 4.844E+00 | 0.000E+00 | -8.344E-06 | 1.103E-08  | -1.825E-11 | 1.951E-14 |

FIG. 6

| SERIAL NUMBER | SURFACE | TYPE | CURVATURE RADIUS (mm) | THICKNESS (mm) | Nd, Vd OF MATERIAL | EFFECTIVE DIAMETER (mm) |
|---|---|---|---|---|---|---|
| 0 | VIRTUAL IMAGE PROJECTED BY OC | PLANE | INFINITY | -1,015.000 | | |
| 1 | L1 SIDE | PLANE | INFINITY | 15.000 | | 8.0 |
| 2 | L1 S1 | ASPHERICAL SURFACE | 80.000 | 3.802 | 1.6355, 23.97 | 36.0 |
| 3 | L1 S2, RP(L1 SIDE) | PLANE | INFINITY | 0.300 | 1.4917, 57.44 | 40.0 |
| 4 | JOINING SURFACE OF RP AND QWP | PLANE | INFINITY | 0.300 | 1.4917, 57.44 | 40.0 |
| 5 | QWP(L2 SIDE) | PLANE | INFINITY | 2.833 | | 40.0 |
| 6 | L2 S3 | ASPHERICAL SURFACE | 250.000 | 6.015 | 1.4940, 57.08 | 43.0 |
| 7 | L2 S4 | ASPHERICAL SURFACE | -67.475 | -6.015 | MIRROR | 45.5 |
| 8 | L2 S3 | ASPHERICAL SURFACE | 250.000 | -2.833 | | 43.0 |
| 9 | QWP(L2 SIDE) | PLANE | INFINITY | -0.300 | 1.4917, 57.44 | 40.0 |
| 10 | JOINING SURFACE OF RP AND QWP | PLANE | INFINITY | 0.300 | MIRROR | 40.0 |
| 11 | QWP(L2 SIDE) | PLANE | INFINITY | 2.833 | | 40.0 |
| 12 | L2 S3 | ASPHERICAL SURFACE | 250.000 | 6.015 | 1.4940, 57.08 | 43.0 |
| 13 | L2 S4 | ASPHERICAL SURFACE | -67.475 | 2.375 | | 45.5 |
| 14 | CP(OC SIDE) | PLANE | INFINITY | 0.281 | 1.4917, 57.44 | 26.0 |
| 15 | JOINING SURFACE OF CP AND D | PLANE | INFINITY | 0.700 | 1.5168, 64.16 | 26.0 |
| 16 | INTERFACE BETWEEN D1 AND S5 | PLANE | INFINITY | 0.000 | | 25.0 |
| 17 | S5 | PLANE | INFINITY | 0.000 | | 24.8 |

FIG. 13

| | k | a | b | c | d | e |
|---|---|---|---|---|---|---|
| S1 | 0.000E+00 | 0.000E+00 | -4.911E-06 | 1.956E-08 | -8.422E-11 | 0.000E+00 |
| S3 | 0.000E+00 | 0.000E+00 | 1.365E-05 | -2.463E-08 | -4.298E-11 | 0.000E+00 |
| S4 | -3.236E+01 | 0.000E+00 | -8.695E-06 | 3.069E-08 | -7.761E-11 | 4.000E-14 |

FIG. 14

WIDE-FIELD VIDEO DISPLAY APPARATUS

BACKGROUND

Technical Field

The present invention relates to a look-in type wide-field video display apparatus having a folded optical path.

Related Art

In recent years, as an example of a look-in type wide-field video display apparatus, a head mounted display (HMD) assumed to be used for virtual reality (VR) application (hereinafter, referred to as an "HMD for VR") is beginning to attract attention.

The HMD for VR has a wider field of view (FOV) (also referred to as a "viewing angle") than a normal HMD not particularly assumed to be used for VR application. For example, the FOV of the normal HMD is usually 45° or less, but the FOV of the HMD for VR is mostly 90° or more. When the FOV of 90° is compared with the FOV of 45°, the value of the FOV doubles, but the diameter of a virtual screen becomes 2.4 times, and the area of the virtual screen even becomes 5.8 times. Accordingly, an HMD for VR makes it possible to provide a higher sense of realism to a user. Note that in non-Patent Document 1, there is disclosed that a greater sense of realism is attained with an increase in a maximum angle of view (viewing angle) of a video and the sense of realism saturates as the angle of view reaches around 80° or more.

As an optical system that can be applied to such an HMD for VR, there have been known, for example, optical systems disclosed in Patent Documents 1 and 2.

CITATION LIST

Patent Document

Patent Document 1: Japanese Translation of PCT International Application Publication No. 2020-519964
Patent Document 2: Japanese Translation of PCT International Application Publication No. 2020-510238

Non-Patent Document

Non-Patent Document 1: Toyohiko Hatada, Haruo Sakata, and Hideo Kusaka, "Induced Effect of Direction Sensation and Display Size", The Journal of the Institute of Television Engineers of Japan Vol. 33 (1979), No. 5, pp. 407-413

Problem to be Solved by the Invention

It is desirable that a look-in type wide-field video display apparatus such as an HMD for VR enables a user to visually recognize a video with a wide field (FOV of 80° or more) and high resolution, is small (thin) and light weight, is excellent in mass productivity, and is produced at a low cost.

However, the actual situation is that apparatuses capable of meeting all of these requests have not yet been provided. For example, to provide the look-in type wide-field video display apparatus to which the optical system disclosed in Patent Document 1 is applied, the following problems remain.

In the optical system disclosed in Patent Document 1, the reflective polarizer is disposed on the curved major surface of the optical lens. To thus dispose the reflective polarizer on the curved surface, a specific production method is required, which leads to a cost increase, and furthermore, a problem remains in terms of reliability.

It is difficult to dispose a retarder layer on the curved surface in terms of the production method, and in the optical system disclosed in Patent Document 1, the retarder layer is disposed on the flat or substantially flat major surface of the optical lens on a side of an imager (a so-called display panel) that emits an image. Therefore, in the optical lens on the display panel side, a major surface on which the retarder layer is disposed cannot be formed as an aspherical surface with a large sag, which makes it impossible to correct the light ray aberration. In the lens having no means for effectively correcting the aberration, it is impossible to increase the power. This is because such a lens cannot cancel the aberration increased when the power is increased. As a result, in the optical system disclosed in Patent Document 1, a magnification is limited. Therefore, in order to obtain a large FOV (80° or more), it is necessary to increase the size of the display panel, but this leaves the following two problems.

1. When the size of the display panel increases, the entire apparatus increases in size and weight.
2. When the size of the display panel increases, a beam (detrimental beam) that is emitted from the display surface thereof, and straightly travels without traveling along the normal optical path (i.e., without being reflected at least one time) increases in thickness, particularly in the optical lens adjacent to the display surface. In order to block the light ray to obtain a clear video, it is necessary to reduce birefringence of the beam over the entire region through which the beam of the optical lens passes. In a plastic lens, the birefringence easily occurs in the peripheral portion, and therefore, the plastic lens cannot be used for the optical lens, and a glass lens has to be used. However, the glass lens is higher in production cost than the plastic lens, and in particular, the aspherical glass lens is significantly higher in production cost than the aspherical plastic lens. In addition, the glass lens is heavier than the plastic lens. Even when the glass lens is produced by molding, for example, the birefringence increases in the lens peripheral portion, and it is necessary to devise the production method.

The above-described problems can also occur in the same manner even when a look-in type wide-field video display apparatus to which the optical system disclosed in Patent Document 2 is applied is provided.

The present invention has been accomplished in view of the above-described actual situation, and an object thereof is to provide a look-in type wide-field video display apparatus that enables a user to visually recognize a video with a wide field (FOV of 80° or more) and high resolution, is small (thin) and light weight, is excellent in mass productivity, and is produced at a low cost.

Means to Solve the Problem

SUMMARY

One aspect of the present invention provides a look-in type wide-field video display apparatus comprising: an ocular optical system, a circular polarizing plate, and a display device positioned in order from a user's eye side, wherein the ocular optical system includes a first lens and a second lens positioned in order from the user's eye side, a first surface that is a surface on the user's eye side in the first lens is aspherical, a second surface that is a surface on a display device side in the first lens is planar or approximately planar, and a reflective polarizing plate and a ¼-wavelength plate are laminated on the second surface in this order from the user's eye side, a third surface that is a surface on the user's eye side in the second lens is aspherical, and is convex toward the user's eye side around an optical axis of the ocular optical system or is approximately planar around the optical axis, a fourth surface that is a surface on the display device side in the second lens is aspherical convex toward the display device side and is coated with a half mirror, and when power of the ocular optical system is represented as P0, power of the first lens is represented as P1, and power of the second lens with respect to video light traveling along a normal optical path after being emitted from the display device is represented as P2, 0.8× P0≤P2≤1.2× P0 and |P1|<¼× P2 are satisfied.

Effect of the Invention

According to the present invention, there can be provided a look-in type wide-field video display apparatus that enables a user to visually recognize a video with a wide field (FOV of 80° or more) and high resolution, is small (thin) and light weight, is excellent in mass productivity, and is produced at a low cost.

BRIEF DESCRIPTION OF THE DRAWINGS

FIG. 5 is a diagram illustrating a configuration table related to an optical system of a wide-field video display apparatus according to Embodiment 1;
FIG. 6 is a diagram illustrating coefficients of an aspherical equation according to Embodiment 1;
FIG. 13 is a diagram illustrating a configuration table related to an optical system of a wide-field video display apparatus according to Embodiment 2;
FIG. 14 is a diagram illustrating coefficients of an aspherical equation according to Embodiment 2;

DETAILED DESCRIPTION OF THE PREFERRED EMBODIMENTS

Hereinafter, an embodiment of the present invention will be described with reference to the drawings.

Figure 1:
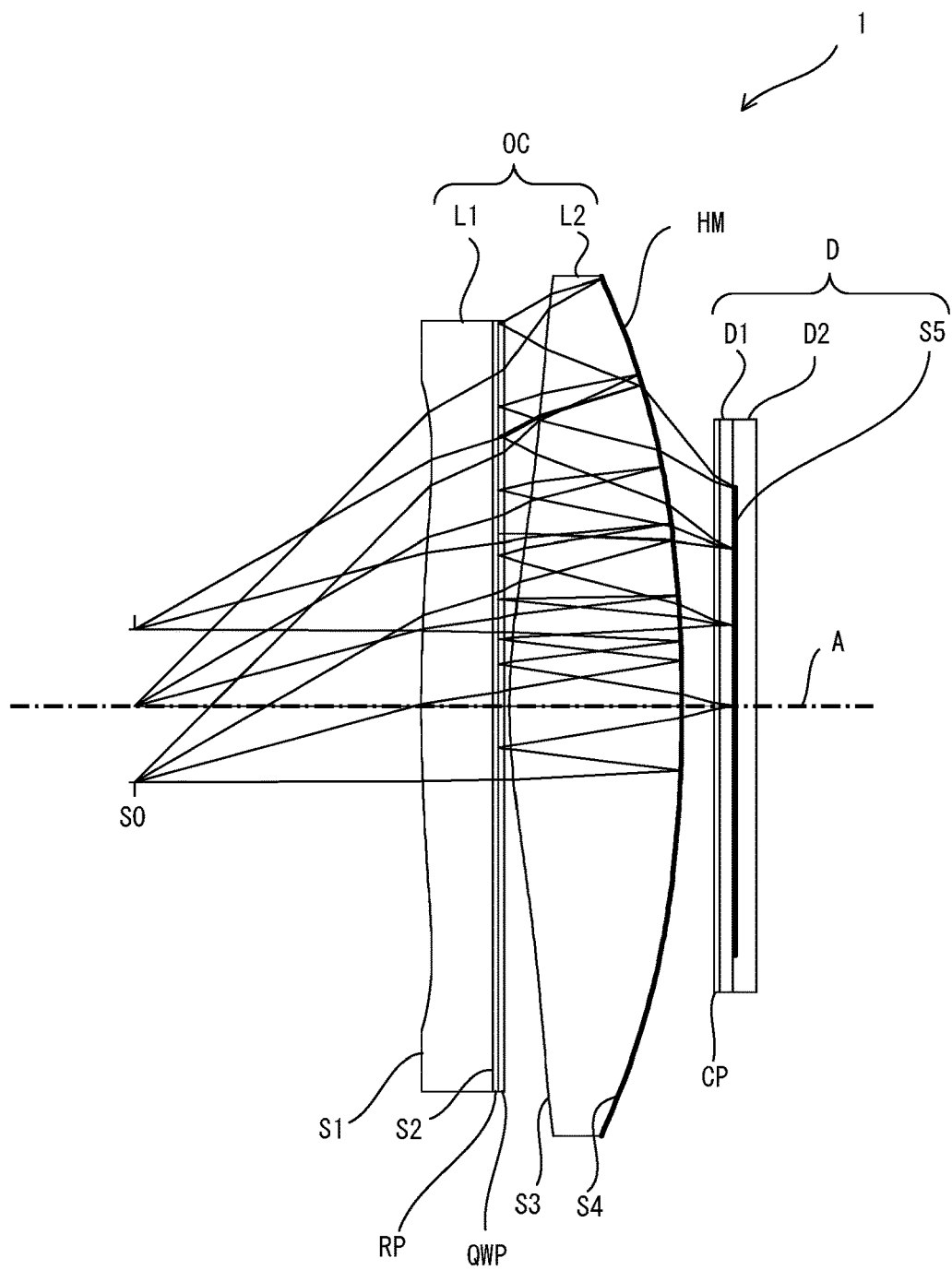
FIG. 1 is a diagram illustrating a configuration of a look-in type wide-field video display apparatus according to one embodiment.
Figure 2:
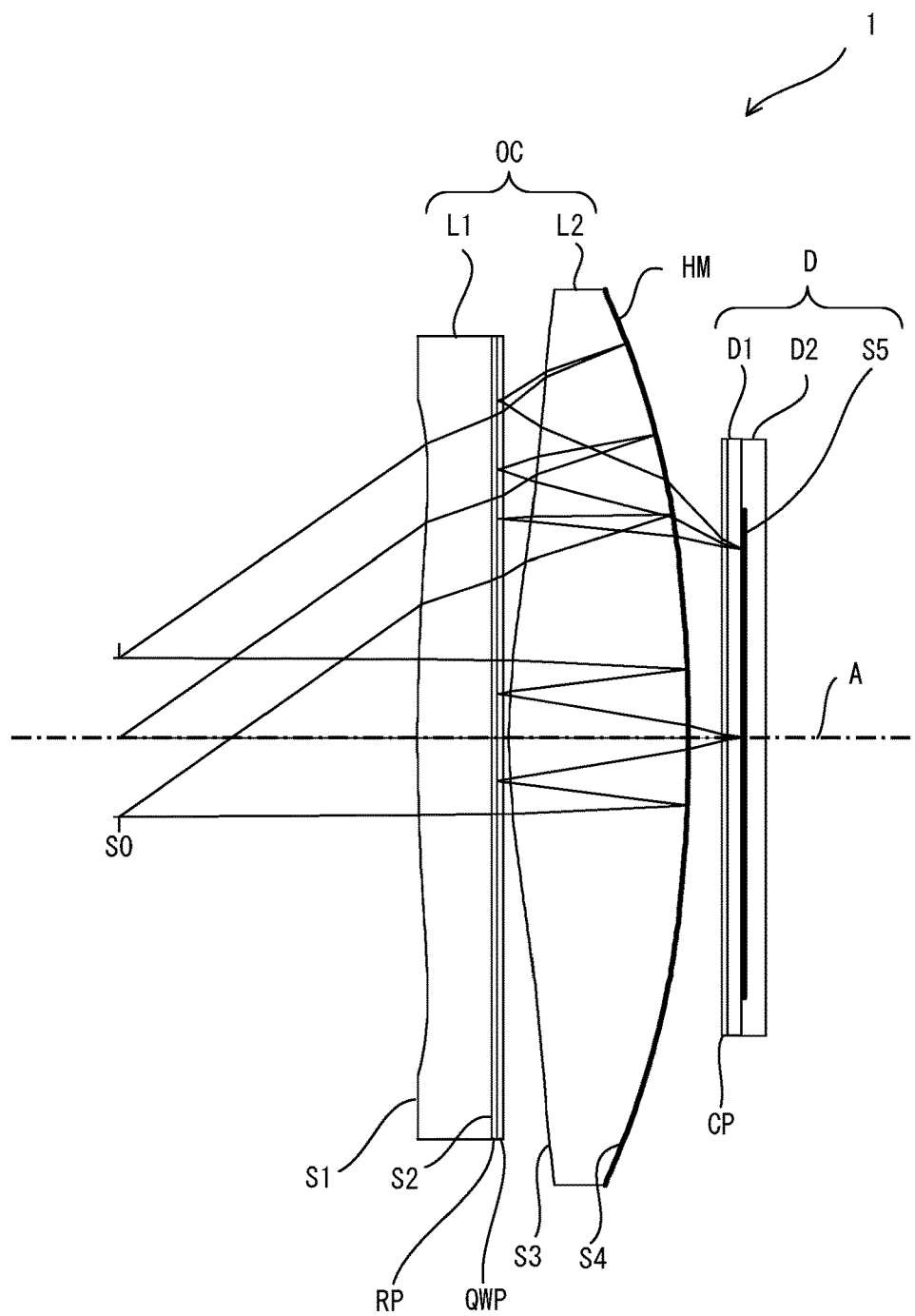
FIG. 2 is a diagram illustrating a normal optical path.

FIG. 1 is a diagram illustrating a configuration of a look-in type wide-field video display apparatus 1 according to one embodiment. FIG. 2 is a diagram illustrating a normal optical path.

The wide-field video display apparatus 1 illustrated in FIG. 1 is a wide-field video display apparatus used by being looked in by a user from a left side of FIG. 1. Note that the wide-field video display apparatus 1 may be prepared for each of a right eye and a left eye of the user or may be prepared only for any one eye of the user. The wide-field video display apparatus 1 can be applied to an HMD for VR, for example.

The wide-field video display apparatus 1 includes an ocular optical system OC, a circular polarizing plate CP, and a display device D positioned in order from a user's eye side. The ocular optical system OC includes a first lens L1 and a second lens L2 positioned in order from the user's eye side.

A first surface S1, which is a surface on the user's eye side in the first lens L1, is aspherical. A second surface S2, which is a surface on a display device D side in the first lens L1, is planar or approximately planar. On the second surface S2, a reflection polarizing plate (reflective polarizing film) RP and a ¼-wavelength plate (¼-wavelength film) QWP are laminated in the stated order from the user's eye side. Examples of the reflective polarizing plate RP include a wire-grid polarizing plate or a cholesteric polarizing plate.

A third surface S3, which is a surface on the user's eye side in the second lens L2, is aspherical, and is convex toward the user's eye side around an optical axis A of the ocular optical system OC. Alternatively, the third surface S3 may be approximately planar around the optical axis A. A fourth surface S4, which is a surface on the display device D side in the second lens L2 is aspherical, and is convex toward the display device D side. The fourth surface S4 is coated with a half mirror (semi-transmissive mirror) HM.

The circular polarizing plate CP is laminated on the display device D. Alternatively, the circular polarizing plate CP may be positioned in a space between the ocular optical system OC and the display device D (more specifically, between the half mirror HM and the display device D) without being laminated on the display device D. The circular polarizing plate CP is formed by laminating a ¼-wavelength plate on a linear polarizing plate, for example.

The display device D includes a video display surface S5 on which a video is displayed, a cover glass D1 which protects the video display surface S5, and a display device substrate D2 which causes a video to be displayed on the video display surface S5. The display device D is a display panel having a large viewing angle, such as an organic light emitting diode (OLED) panel or a micro light emitting diode (LED) panel.

In the wide-field video display apparatus 1 having such a configuration, video light emitted from the display device D travels along a normal optical path (including a folded optical path) illustrated in FIG. 2 (and FIG. 1), and enters the eye (pupil) of the user.

As illustrated in FIG. 2 (and FIG. 1), the video light emitted from the video display surface S5 of the display device D via the cover glass D1 passes first through the circular polarizing plate CP. Thus, a polarization state of the video light is changed to a right-handed or left-handed circular polarization state.

After the video light passes through the circular polarizing plate CP, a part of the video light is transmitted through the half mirror HM, and the remainder is reflected by the half mirror HM, generating unwanted light.

The video light that has been transmitted through the half mirror HM passes through the second lens L2 having the fourth surface S4 and the third surface S3 in this order of the fourth surface S4, the third surface S3.

The video light that has been transmitted through the second lens L2 passes through the ¼-wavelength plate QWP. Thus, a polarization state of the video light is changed from a right-handed or left-handed circular polarization state to a linear polarization state. Here, an azimuth angle of the polarization surface is set to 0°.

The video light that has passed through the ¼-wavelength plate QWP is reflected by the reflective polarizing plate RP. Here, the reflective polarizing plate RP reflects the light in the linear polarization state with the azimuth angle 0°, and transmits the light in the linear polarization state with the azimuth angle 90°.

The video light that has been reflected by the reflective polarizing plate RP passes through the ¼-wavelength plate QWP again. Thus, the polarization state of the video light is changed from the linear polarization state with the azimuth angle 0° to the right-handed or left-handed circular polarization state.

The video light that has passed through the ¼-wavelength plate QWP passes again through the second lens L2 having the fourth surface S3 and the third surface S4 in this order of the fourth surface S3, the third surface S4.

After the video light passes through the fourth surface S4 of the second lens L2, a part of the video light is reflected by the half mirror HM, and the remainder is transmitted through the half mirror HM, generating unwanted light.

The video light that has been reflected by the half mirror HM passes again through the second lens L2 in this order of the fourth surface S4, the third surface S3.

The video light that has passed through the second lens L2 passes through the ¼-wavelength plate QWP again. Thus, the polarization state of the video light is changed from the right-handed or left-handed circular polarization state to the linear polarization state with the azimuth angle 90°.

The video light that has passed through the ¼-wavelength plate QWP is transmitted through the reflective polarizing plate RP, and passes through the first lens L1 having the second surface S2 and the first surface S1 in this order of the second surface S2, the first surface S1. Then, the video light that has passed through the first lens L1 passes through a pupil plane S0, and enters the eye (pupil) of the user. Note that the position of the pupil plane S0 is an assumed position of the eye (pupil) of the user.

In the wide-field video display apparatus 1, when the power of the ocular optical system OC is represented as P0, the power of the first lens L1 is represented as P1, and the power of the second lens L2 with respect to the video light that is emitted from the display device D and follows the above-described normal optical path is represented as P2, the relationship between P0 and P2 satisfies the following expression (1), and the relationship between P1 and P2 satisfies the following expression (2).

$$0.8 \times P0 \leq P2 \leq 1.2 \times P0 \qquad \text{Expression (1)}$$

$$|P1| < \tfrac{1}{4} \times P2 \qquad \text{Expression (2)}$$

When the power P2 of the second lens L2 is 0.06 (unit: 1/mm) or less, a surface around the optical axis A in the third surface S3 of the second lens L2 is an approximation plane satisfying the following expression (3), where PW3 represents the power of the third surface S3, and PW4R represents the power at the reflection to the user's eye side by the half mirror HM coated on the fourth surface S4.

$$|PW3| > -\tfrac{1}{10} \times PW4R \qquad \text{Expression (3)}$$

The power P0 (unit: 1/mm) of the ocular optical system OC satisfies the following expression (4).

$$0.05 < P0 < 0.075 \qquad \text{Expression (4)}$$

When the maximum size of the video displayed on the video display surface S5 of the display device D is represented as DD, and the effective diameter of the second lens L2 is represented as ED, the relationship between DD and ED satisfies the following expression (5).

$$DD < 0.8 \times ED \qquad \text{Expression (5)}$$

Note that DD also represents a diameter of a circle circumscribed by a display region of the video when the video is displayed on the video display surface S5. Furthermore, ED also represents a diameter of a circle circumscribed by a region in which the beam of the video projected into the eye (pupil) of the user passes through the second lens L2.

The material of the second lens L2 is preferably a resin material having a refractive index Nd satisfying the following expression (6) and an abbe number Vd satisfying the following expression (7).

$$Nd < 1.65 \qquad \text{Expression (6)}$$

$$Vd > 50 \qquad \text{Expression (7)}$$

When, assuming that the position of the pupil S0 is a position of 12 mm toward the user's eye side from the first surface S1 of the first lens L1, a chief ray that travels at an inclination θ with respect to the optical axis A after passing through the pupil plane S0 is reversely traced from the pupil plane S0 toward the first surface S1, the chief ray that first enters the third surface S3 of the second lens L2 is inclined in a direction away from the optical axis A toward the traveling direction, and the chief ray emitted from the fourth surface S4 of the second lens L2 is inclined in a direction approaching the optical axis A toward the traveling direction.

For example, in the case where θ is 40°, when an incident angle of the chief ray that first enters the third surface S3 with respect to the third surface S3 is represented as θ3, and an exit angle of the chief ray that is emitted from the fourth surface S4 with respect to the fourth surface S4 is represented as θ4, θ3 satisfies the following expression (8) and/or θ4 satisfies the following expression (9).

$$|\theta 3| > 30° \qquad \text{Expression (8)}$$

$$|\theta 4| > 30° \qquad \text{Expression (9)}$$

Hereinafter, the function and the effect of the wide-field video display apparatus 1 having such a configuration will be described in detail. Unless otherwise specified, hereinafter, the description will be made on the assumption of reverse tracing by which the light ray from the user's eye side to the display device D side is traced.

In the wide-field video display apparatus 1, as is apparent from the fact that the above-described expressions (1) and (2) are satisfied, the second lens L2 mainly provides the majority of the power of the ocular optical system OC.

Focusing on the optical path related to the second lens L2 in the above-described normal optical path (including a folded optical path), the power P2 of the second lens L2 is obtained approximately by the following expression (10).

$$P2 \approx PW4 + PW3\_1 + PW3\_2 + PW4R + PW3\_3 \qquad \text{Expression (10)}$$

Here, each power element of PW4, PW3_1, PW3_2, PW4R, and PW3_3 is as follows. Note that PW3_1, PW3_2, and PW3_3 have the same value PW3.

PW4 refers to power caused by the refraction occurring on the fourth surface S4 when the video light that has passed through the circular polarizing plate CP and then been transmitted through the half mirror HM enters the fourth surface S4.

PW3_1 refers to power caused by the refraction occurring on the third surface S3 when the video light that has passing through the half mirror HM is entered the fourth surface S4 and is emitted from the third surface S3.

PW3_2 refers to power caused by the refraction occurring on the third surface S3 when the video light that has been reflected by the reflective polarizing plate RP and then passed through the ¼-wavelength plate QWP enters the third surface S3.

PW4R refers to power caused by the reflection occurring on the half mirror HM when the video light that has entered the third surface S3 is reflected by the half mirror HM. This power can be calculated by the following expression (11-3) using the optical formula.

PW3_3 refers to power caused by the refraction occurring on the third surface S3 when the video light that has been reflected by the half mirror HM and then entered the fourth surface S4 is emitted from the third surface S3.

Note that PW4 can be calculated by the following expression (11-1) using the optical formula.

$$PW4 = (1 - Nd) \times C4 \qquad \text{Expression (11-1)}$$

Here, Nd represents a refractive index of the second lens L2, and C4 represents a curvature of the fourth surface S4.

PW3_1, PW3_2, and PW3_3 have the same value PW3. This power can be calculated by the following expression (11-2) using the optical formula.

$$PW3 = (Nd - 1) \times C3 \qquad \text{Expression (11-2)}$$

Here, C3 represents a curvature of the third surface S3.

PW4R can be calculated by the following expression (11-3) using the optical formula.

$$PW4R = -2 \times Nd \times C4 \qquad \text{Expression (11-3)}$$

The second lens L2 has the third surface S3 and the fourth surface S4, both which are convex, and therefore power elements on the right side of the above-described expression (10) are all positive values. Thus, the power to be borne by the second lens L2 is obtained by combining relatively small power elements. Furthermore, as is obvious from the comparison between the above-described expression (11-1) and the above-described expression (11-3), the fourth surface S4 can create PW4R having the required magnitude at a particularly gentle curvature.

As a result, the second lens L2 is formed of a convex surface having a gentle curvature, and can create large power satisfying the above-described expressions (1) and (4), which makes it possible to reduce the occurrence of the aberration.

The second lens L2 can create the required power even when the lens is made of the material with relatively small refractive index Nd. Therefore, the material with a large abbe number Vd, i.e., small dispersion can be selected as the material of the second lens L2. Selecting the material with small dispersion can reduce the occurrence of the chromatic aberration of the second lens L2.

Specifically, the material of the second lens L2 is preferably selected from the materials falling within the range satisfying the above-described expressions (6) and (7). Selecting an injection-moldable resin material falling within the range enables the second lens L2 to be easily produced at low cost.

Furthermore, both of the third surface S3 of the second lens L2 and the first surface S1 of the first lens L1 are aspherical and face air, and therefore provide a high aberration correction effect, which enables these surfaces to correct the aberration of the entire ocular optical system OC at a practically sufficient level.

Note that when the power P0 of the ocular optical system OC is 0.06 (unit: 1/mm) or less, the power of the second lens L2 is substantially the same as the power P0 of the ocular optical system, and therefore the power required for the second lens L2 is also 0.06 (unit: 1/mm) or less. The magnitude of this power can be naturally created only using PW4R calculated by the above-described expression (11-3). In this case, if satisfying the above-described expression (3), the aspherical third surface S3 may be an approximation plane that is nearly plane around the optical axis A.

The power P2 of the second lens L2 is a positive value, and therefore, the above-described expression (2) can be transformed to the following expression (12).

$$-\tfrac{1}{4} \times P2 < P1 < \tfrac{1}{4} \times P2 \qquad \text{Expression (12)}$$

Furthermore, when the power P1 of the first lens L1 is a positive value, the above-described expression (12) can be expressed as the following expression (13), and when the power P1 of the first lens L1 is a negative value, the above-described expression (12) can be expressed as the following expression (14).

$$P1 < \tfrac{1}{4} \times P2 \qquad \text{Expression (13)}$$

$$-\tfrac{1}{4} \times P2 < P1 \qquad \text{Expression (14)}$$

When the power P0 of the ocular optical system OC is increased to create a large FOV from a small display device D, a focal length is reduced, and therefore in order to secure sufficient eye relief from the ocular optical system OC and secure a distance between the ocular optical system OC and the display device D, it is important to satisfy the above-described expressions (13) and (14) as described below.

Since the FOV is large, an outer diameter (DL1) of the first lens L1 approximately calculated by the following expression (15) is large.

$$DL1 \approx 2 \times eye\ relief \times \tan(FOV/2) \qquad \text{Expression (15)}$$

Therefore, in the case where the first lens L1 has positive power, when the power P1 of the first lens L1 is increased, it is necessary to greatly increase the center thickness in order to secure the edge thickness. The increase in thickness of the first lens L1 has an effect of reducing the eye relief.

In addition, the focal length of the ocular optical system OC is small, less than 20 mm from the above-described expression (4), and therefore, when the power of the first lens L1 exceeds a fixed value, it is difficult to secure the eye relief.

As a balance of power between the first and second lenses L1 and L2, the power of the second lens L2 is reduced to maintain a balance between the power of the first lens L1 and the power of the second lens L2, a rear-side focal position of the ocular optical system OC moves in an inward direction of the ocular optical system OC. Therefore, when the positive power of the first lens L1 with respect to the second lens L2 exceeds a certain limit, the rear-side focal position moves into the ocular optical system OC. Since a virtual image needs to be projected further away, it is necessary to position the video display surface S5 of the display device D in the vicinity of the rear-side focal position of the ocular optical system OC. Therefore, to avoid physical interference, the rear-side focal position of the ocular optical system OC must be positioned on the outer side (right side in FIG. 1 or FIG. 2) of the ocular optical system OC with respect to the fourth surface S4 of the second lens L2.

On the other hand, in the case where the first lens L1 has negative power, as the negative power of the first lens L1 increases, the beam diameter of the video light passing through the second lens L2 increases. In addition, since the second lens L2 needs to cancel the negative power of the first lens L1, it is necessary to increase the positive power. Therefore, when the negative power of the first lens L1 exceeds a certain limit, the video marginal light that ought to pass through the second lens L2 and travel toward the display device D is totally reflected on the fourth surface S4 of the second lens L2.

In the first lens L1, the second surface S2 is planar or approximately planar, and the first surface S1 is aspherical. In this aspherical surface, the curvature increases in the negative direction toward the outer periphery to correct tangential field curvature occurring in the negative direction in the second lens L2, and therefore, in the particularly large FOV, the outer periphery of the first surface S1 projects toward the user's eye side (for example, see FIG. 1). As the negative power of the first lens L1 increases, the projection amount increases, which easily causes interference with the face of the user.

The first lens L1 has the aspherical first surface S1 and plays an important role of canceling the aberration occurring in the second lens L2, but as described above, if the power of the first lens L1 is not approximately set, there occur problems in that sufficient eye relief cannot be secured and a distance between the second lens L2 and the display device D cannot be secured. However, these problems can be avoided by satisfying the above-described expressions (13) and (14).

In this way, the first lens L1 is thin, resulting in less reduction of the eye relief.

In the wide-field video display apparatus 1, the second surface S2 of the first lens L1 is planar or approximately planar, and therefore even when the reflective polarizing plate RP and the ¼-wavelength plate QWP are laminated on the second surface S2, good adhesion can be maintained.

When the diameter of the laminated surface of the second surface S2 on which the reflective polarizing plate RP and the ¼-wavelength plate QWP are laminated is represented as DL, and the maximum value of the sag of the second surface S2 is represented as SL, the second surface S2 that is planar or approximately planar is a plane, a spherical surface, or an aspherical surface that satisfies the following expression (16).

$$0.05 \times DL > |SL| \quad \text{Expression (16)}$$

For example, even when the second surface S2 is a spherical surface and the maximum value of the sag is approximate to the limit defined by the above-described expression (16), the reflective polarizing plate (reflective polarizing film) RP and the ¼-wavelength plate (¼-wavelength film) QWP can be laminated on the second surface S2 by increasing or decreasing their respective dimensions in the circumferential direction by about 0.6%. This degree of increase or decrease is a value that can be naturally obtained if the reflective polarizing plate (reflective polarizing film) RP and the ¼-wavelength plate (¼-wavelength film) QWP each are formed of a resin film as a base material.

In the wide-field video display apparatus 1, the above-described expression (5) is satisfied. This contributes to suppression of generation of the ghost as described below.

Figure 3:
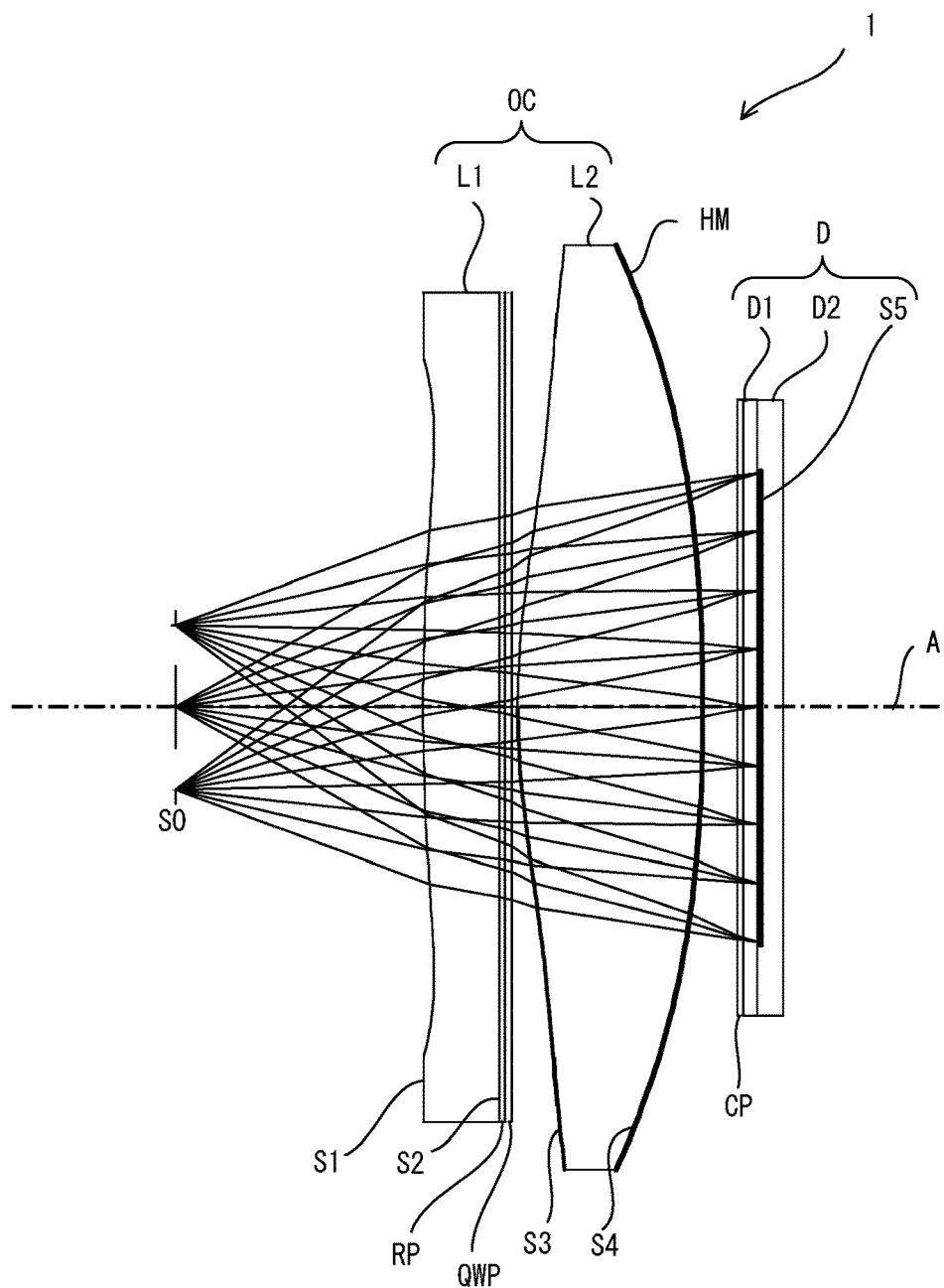
FIG. 3 is a diagram illustrating a straight optical path that may generate a ghost.

FIG. 3 is a diagram illustrating straight light. The straight light is light that is emitted from the display device D and passes through the pupil plane S0 without traveling along the normal optical path (i.e., without being reflected at least one time) as illustrated in FIG. 2 (and FIG. 1), and refers to stray light that may generate a ghost.

In the wide-field video display apparatus 1, the straight light is blocked (shaded) by the reflective polarizing plate RP and the ¼-wavelength plate QWP laminated on the second surface S2 of the first lens L1, but if a retardation exists in the second lens L2, the circular polarization state of the light that has been emitted from the display device D and has passed through the circular polarizing plate CP is destroyed while passing through the second lens L2, thereby there is a possibility that a light shading effect by the reflective polarizing plate RP and the ¼-wavelength plate QWP does not function sufficiently.

It is important not only to make the second lens L2 of a material with small birefringence, but also to shorten the optical path in the lens peripheral portion in which internal stress remains and the more birefringence is easily generated due to the photoelastic effect, since the retardation is proportional to the birefringence and the optical path length, and the second lens L2 that has the third surface S3 and the fourth surface S4, both of which are convex, is formed into a shape appropriate therefor.

Furthermore, as illustrated in FIG. 3, the straight light that is emitted from the display device D, passes through the ocular optical system OC without being reflected at least one, and passes through the pupil plane S0 is convergent light traveling from the display device D toward the user's eye side, including a subordinate ray, and the size of a region where this beam passes through the second lens L2 is below the size of the video displayed on the video display surface S5.

When the wide-field video display apparatus 1 satisfies the above-described expression (5), the straight light that is emitted from the video display surface S5 and passes through the pupil plane S0 passes through the second lens L2 while avoiding the peripheral portion with large birefringence.

Thus, the allowable amount of the birefringence in the peripheral portion of the second lens L2 can be greatly relaxed. The retardation is preferably 10 nm or less at the center portion of the second lens L2, but in the peripheral portion, the retardation may be about several tens nm.

In the second lens L2, the third surface S3 is aspherical, and therefore, the production method is preferably molding, considering the mass productivity. In the molding, the thermal stress remains in the lens peripheral portion, and the birefringence is more likely to become larger by the photoelastic effect. However, if the above-described expression (5) is satisfied, the molding can be used for production using glass or the resin material with relatively small birefringence. As the resin material used at this time, a resin material such as Optimas (registered trademark) made by MITSUBISHI GAS CHEMICAL COMPANY, INC., AZP (registered trademark) published in 2014 by Asahi Kasei Corp., or APEL (registered trademark) made by Mitsui Chemicals, Inc. can be used, for example.

Note that these each are an acrylic material that satisfies the above-described expressions (6) and (7).

In the wide-field video display apparatus 1, the above-described expression (4) is satisfied.

Here, the reason why the power P0 of the ocular optical system OC is below 0.075 (unit: 1/mm) is because the second lens L2 can create strong power as a single lens, but as the power is stronger, the aberration is increased, and particularly when the power exceeds 0.075 (unit: 1/mm), the aberration is significantly increased.

In addition, the reason why the power P0 of the ocular optical system OC is above 0.05 (unit: 1/mm) is because in the second lens L2, as the power is smaller, the aberration is brought into the satisfactory state, but when the power of the ocular optical system OC is 0.05 (unit: 1/mm) or less, DD (the maximum size of the video displayed on the video display surface S5) on the left side of the above-described expression (5) becomes too large, which makes it difficult to satisfy the above-described expression (5).

In the wide-field video display apparatus 1, the relationship between the focal length reflecting image distortion and the FOV is expressed by the following expression (17).

$$EFL=(DD/2)/\{(1+Dis/100)\times\tan(FOV/2)\} \quad \text{Expression (17)}$$

Here, EFL represents a focal length of the ocular optical system OC.

Dis (unit: %) represents percentage distortion in the video edge portion of the ocular optical system OC, defined by the following expression (18).

$$Dis=(\text{Actual maximum image height}-\text{Ideal maximum image height})/(\text{Ideal maximum image height})\times 100 \quad \text{Expression (18)}$$

FOV represents a viewing angle of the ocular optical system OC.

As described above, DD represents the maximum size of the video displayed on the video display surface S5. Note that DD/2 represents an image height of the video.

The optical formula satisfied in the optical system without image distortion is expressed by the following expression (19).

$$\text{Ideal image height}=\text{Focal length}\times\tan(\text{Viewing angle}) \quad \text{Expression (19)}$$

In the optical system with image distortion, the relationship between the actual image height and the ideal image height is expressed by the following expression (20).

$$\text{Actual image height}=(1+Dis/100)\times\text{Ideal image height} \quad \text{Expression (20)}$$

The following expression (21) can be derived from the above-described expressions (19) and (20).

$$\text{Ideal image height}=\text{Focal length}\times\tan(\text{Viewing angle})\times(1+Dis/100) \quad \text{Expression (21)}$$

The above-described expression (17) can be derived by transforming the above-described expression (21).

The relationship between the power P0 and the image distortion of the ocular optical system OC is expressed by the following expression (22) using the above-described expression (17).

$$P0=1/EFL=\{(1+Dis/100)\times\tan(FOV/2)\}/(DD/2) \quad \text{Expression (22)}$$

When the comparison is made between the ocular optical systems having the same FOV, the ocular optical system with negative Dis can reduce the power of the ocular optical system as compared with the ocular optical system without Dis. For example, when Dis is −30%, the power of the ocular optical system can be reduced by 30% as compared with the ocular optical system without Dis.

In the wide-field video display apparatus 1, the power of the ocular optical system OC is substantially the same as the power of the second lens L2, and therefore, it can be said that the power of the second lens L2 can be reduced by about 30%.

As described above, the second lens L2 can create strong power, but as the power is stronger, the aberration is increased, and therefore, the power of the second lens L2 is preferably small to obtain excellent resolution performance. In particular, when the power of the second lens L2 is 0.075 (unit: 1/mm) or more, the aberration is significantly increased.

That is, the negative Dis can achieve the ocular optical system OC with higher resolution performance while maintaining FOV. In other words, the negative Dis can achieve the ocular optical system OC with larger FOV while maintaining the resolution performance.

As described above, in the wide-field video display apparatus 1, when, assuming that the position of the pupil plane S0 is a position of 12 mm from the first surface S1 of the first lens L1, a chief ray that travels at an inclination θ with respect to the optical axis A after passing through the pupil plane S0 is reversely traced from the pupil plane S0 toward the first surface S1, the chief ray that first enters the third surface S3 of the second lens L2 is inclined in a direction away from the optical axis A toward the traveling direction, and the chief ray emitted from the fourth surface S4 of the second lens L2 is inclined in a direction approaching the optical axis A toward the traveling direction.

Figure 4:
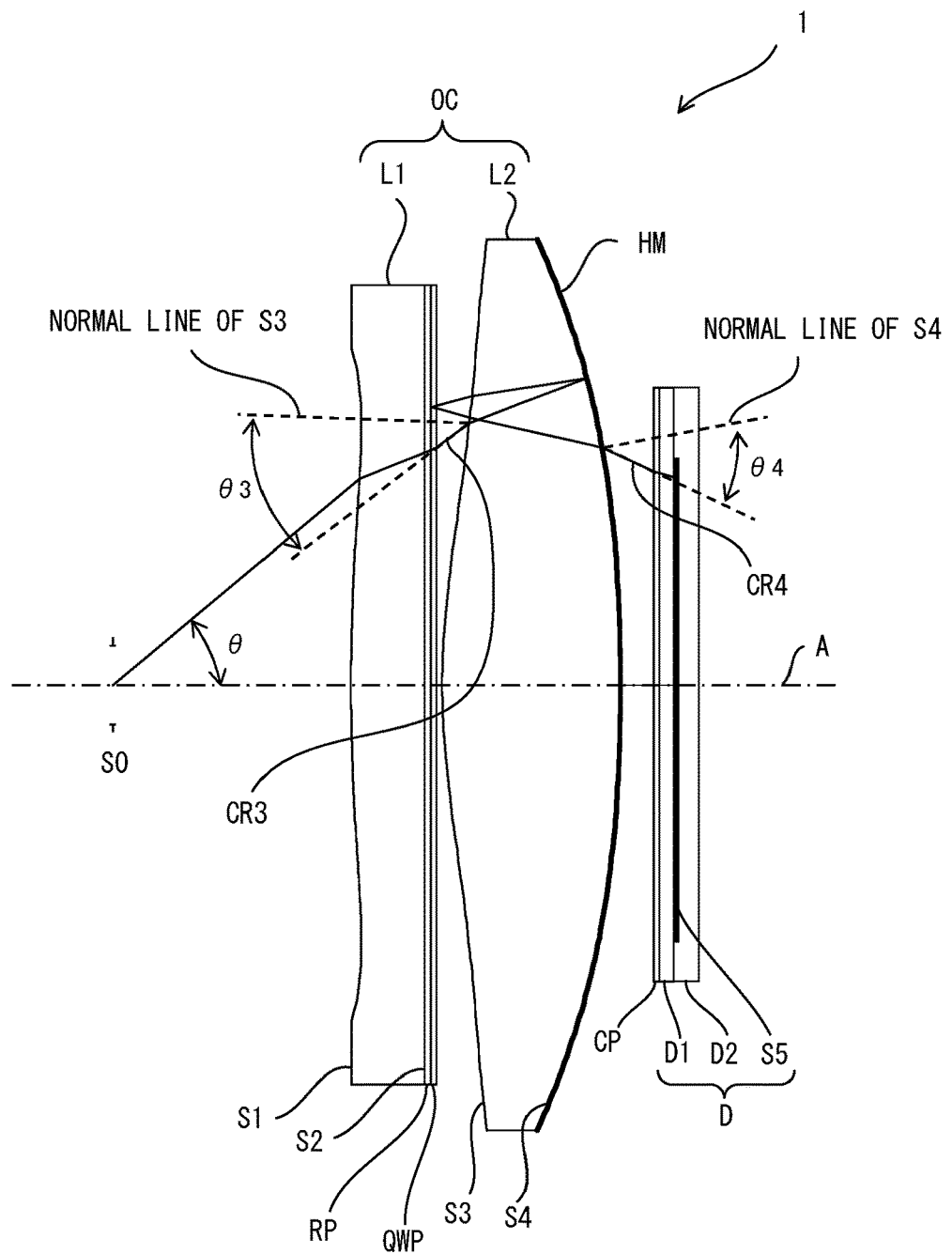
FIG. 4 is a diagram illustrating a chief ray that travels at an inclination θ with respect to an optical axis A after passing through a pupil plane S0.

FIG. 4 is a diagram illustrating a chief ray that travels at an inclination θ with respect to the optical axis A after passing through the pupil plane S0.

As illustrated in FIG. 4, when the chief ray is reversely traced from the pupil plane S0 toward the first lens L1, a chief ray CR4 that is emitted from the fourth surface S4 of the second lens L2 is inclined in the direction approaching the optical axis A toward the traveling direction, and since the fourth surface S4 is convex toward the display device D side, an exit angle θ4 of the chief ray CR4 from the fourth surface S4 has a large clockwise angle. Therefore, large negative spherical aberration occurs in the chief ray in the fourth surface S4. Furthermore, a chief ray CR3 that first enters the third surface S3 of the second lens is inclined in the direction away from the optical axis A toward the traveling direction, and since the third surface S3 is convex toward the user's eye side around the optical axis A or is approximately planar around the optical axis A, an incident angle θ3 of the chief ray CR3 with respect to the third surface S3 has a counterclockwise clockwise angle. Therefore, negative spherical aberration occurs in the chief ray in this surface S3. In particular, when the third surface S3 is convex toward the user's eye side, the incident angle θ3 is increased, whereby large negative spherical aberration occurs.

In this way, when the negative spherical aberration occurs in the chief ray in the second lens L2, the chief ray being reversely traced from the pupil plane S0 toward the first lens L1, the height of the chief ray when passing through the video display surface S5 of the display device D can be reduced, the chief ray being emitted from the pupil plane S0 at the inclination angle (θ=40°), for example. That is, an effect of creating the negative Dis is generated. As described above, this is preferable in designing the ocular optical system OC with large FOV while maintaining the resolution performance.

In this case, when the above-described expression (8) and/or (9) is satisfied, it is possible to create the negative Dis enough to enable the design in which FOV exceeds 80° while reducing the power of the second lens L2 to less than 0.075 (unit: 1/mm).

Note that the reason why the position of the pupil plane S0 is assumed as a position of 12 mm from the first surface S1 of the first lens L1 is because when the position of the pupil plane S0 changes, θ3 and θ4 change, and therefore, it is necessary to assume the position of the pupil plane S0 in order to quantitatively specify θ3 and θ4. In general, eyeglasses are adjusted so that a distance between eyes and glass lenses is 12 mm. This is to prevent the glass lenses from becoming dirty due to splash of tears by blink of eyes. Also in the wide-field video display apparatus 1, the distance between the ocular optical system OC and the eye is preferably increased to 12 mm or more.

As described above, in the wide-field video display apparatus 1 according to one embodiment, the third surface S3 of the second lens L2 is convex or approximately planar, the fourth surface S4 is convex, and the positive power elements (see the above-described expression (10)) for substantial five surfaces are provided by the folded optical path created using the polarization and the reflection. Thus, the second lens L2 can create strong positive power in the convex surface with gentle curvature, which makes it possible to suppress the occurrence of the aberration. In addition, sufficiently strong positive power can be created using the material with a low refractive index, and therefore the material with low dispersion can be selected, which makes it possible to prevent the occurrence of the chromatic aberration.

The first surface S1 of the first lens L1 and the third surface S3 of the second lens L2 are aspherical surfaces facing air, and when the surfaces face air, a difference in the refractive index between the interfaces is large, and therefore, the first surface S1 and the third surface S3 can correct the aberration strongly even in the case of the relatively gentle aspherical surfaces. This can design the ocular optical system OC with excellent resolution, and can provide the thin ocular optical system OC by reducing the sags.

Both of the third surface S3 and the fourth surface S4 of the second lens L2 are convex, and therefore the large incident angle θ3 and exit angle θ4 of the chief ray are obtained, and the negative image distortion is created in the reverse tracing. Thus, the video with large FOV can be projected from the display device D with small size of the video display surface while suppressing the power of the second lens L2. The video display surface size can be designed to be smaller than the outer diameter of the second lens L2. Thus, the stray light traveling straightly in the ocular optical system OC travels in the second lens L2 while avoiding the lens peripheral portion with large birefringence, whereby the allowable amount of the birefringence in the peripheral portion of the second lens L2 can be increased, and the second lens L2 can be produced by resin molding. According to the molding, even the aspherical lens can be produced at low cost.

The distribution of the power of the first lens L1 and the second lens L2 makes it possible to secure sufficient eye relief and make the design with avoiding the interference between the ocular optical system OC and the display device D.

This provides advantageous effects in which the wide-field video display apparatus 1 according to one embodiment enables a user to visually recognize a video with a wide field (FOV of 80° or more) and high resolution, is small (thin) and light weight, is excellent in mass productivity, and is produced at a low cost.

Hereinafter, as specific examples of the wide-field video display apparatus 1 according to one embodiment, the specific example of a case where the third surface S3 of the second lens L2 is convex toward the user's eye side around the optical axis A will be described as Embodiment 1, and the specific example of a case where the third surface S3 of the second lens L2 is approximately planar around the optical axis A will be described as Embodiment 2. Note that in the configuration table shown in each embodiment, the serial numbers are assigned in the reverse tracing direction of the optical path of the video light. In each embodiment, as reference to the optical specifications and performance, those obtained by reversely tracing the optical path are shown in consideration of the Law of Reversibility of Light. In each embodiment, the material of the second lens L2 is Optimas (registered trademark) 7500 made by MITSUBISHI GAS CHEMICAL COMPANY, INC.

Embodiment 1

In a wide-field video display apparatus 1 according to Embodiment 1, its configuration, a normal optical path, a straight optical path that may generate a ghost, and a chief ray that travels at an inclination θ(40°) after passing through a pupil plane S0 are the same as those shown in FIGS. 1, 2, 3, and 4.

FIG. 5 is a diagram illustrating a configuration table related to an optical system of the wide-field video display apparatus 1 according to Embodiment 1. FIG. 6 is a diagram illustrating coefficients of an aspherical equation according to Embodiment 1.

The configuration table illustrated in FIG. 5 shows the type of the surface corresponding to each serial number, the curvature radius around the optical axis A, the thickness around the optical axis A, the material (Nd, Vd), and the effective diameter. The sag of each aspherical surface can be obtained by the aspherical equation of the following expression (23).

$$Sag = (Y^2/R)/[1+SQRT\{1-(1+k)\times(Y/R)^2\}] + a \times Y^2 + b \times Y^4 + c \times Y^6 + d \times Y^8 + e \times Y^{10} \qquad \text{Expression (23)}$$

Here, Y (unit: mm) represents a distance from the optical axis A.

R (unit: mm) represents a curvature radius around the optical axis A.

Sag (unit: mm) represents a coordinate in a direction of the optical axis A with respect to a center of the optical axis of the surface in Y as an origin.

Coefficients k, a, b, c, d, and e with respect to each aspherical surface are as shown in FIG. 6.

In the wide-field video display apparatus 1 according to Embodiment 1, P0, P1, P2, PW3, and PW4R are as follows.

P0: 0.0624 (unit: 1/mm)

P1: 0.0062 (unit: 1/mm)
P2: 0.0608 (unit: 1/mm)
PW3: 0.013161 (unit: 1/mm)
PW4R: 0.031616 (unit: 1/mm)
Here, $$P2=0.97\times P0,$$

$$|P1|=0.10\times P2, \text{ and}$$

the above-described expressions (1) and (2) are satisfied, and the above-described expression (4) is also satisfied.

The material of the second lens L2 is Optimas (registered trademark) 7500 made by MITSUBISHI GAS CHEMICAL COMPANY, INC., and the above-described expressions (6) and (7) are also satisfied.

In the wide-field video display apparatus 1 according to Embodiment 1, FOV, DD, Dis, θ3, and θ4 are as follows.
 FOV: 80°
 DD: 22.8 mm
 Dis: −30%
 θ3: 42.9°
 θ4: 35.3°

Here, DD is 22.8 mm, and from the effective diameter of the second lens L2 in the configuration table shown in FIG. 5, the above-described expression (5) is also satisfied.

In addition, θ3 is 42. 9° and θ4 is 35.3°, and therefore both of the above-described expressions (8) and (9) are also satisfied.

Figure 7:
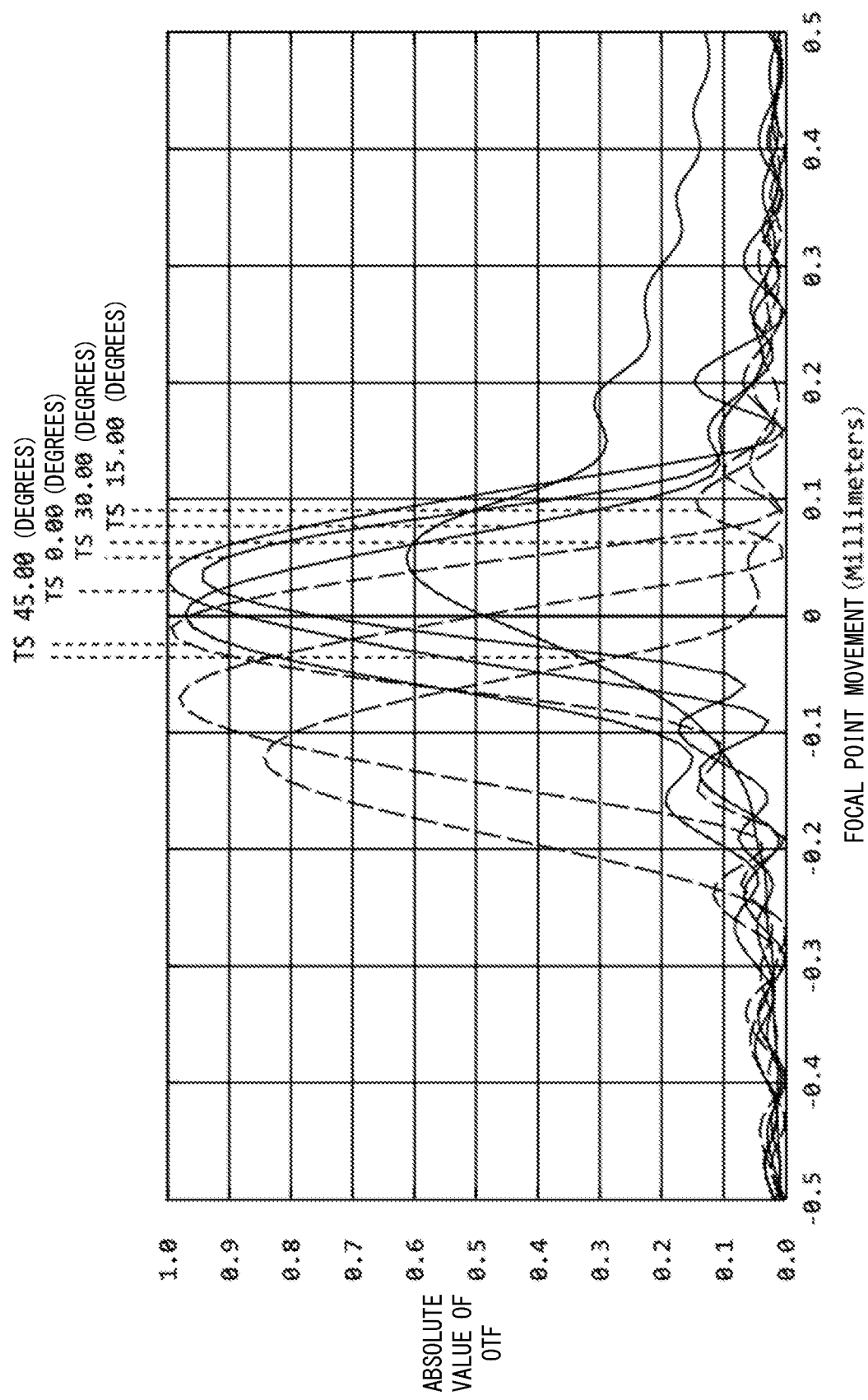
FIG. 7 is a diagram illustrating a graph showing a relationship between a focal point movement and an absolute value of an OTF, according to Embodiment 1.
Figure 8:
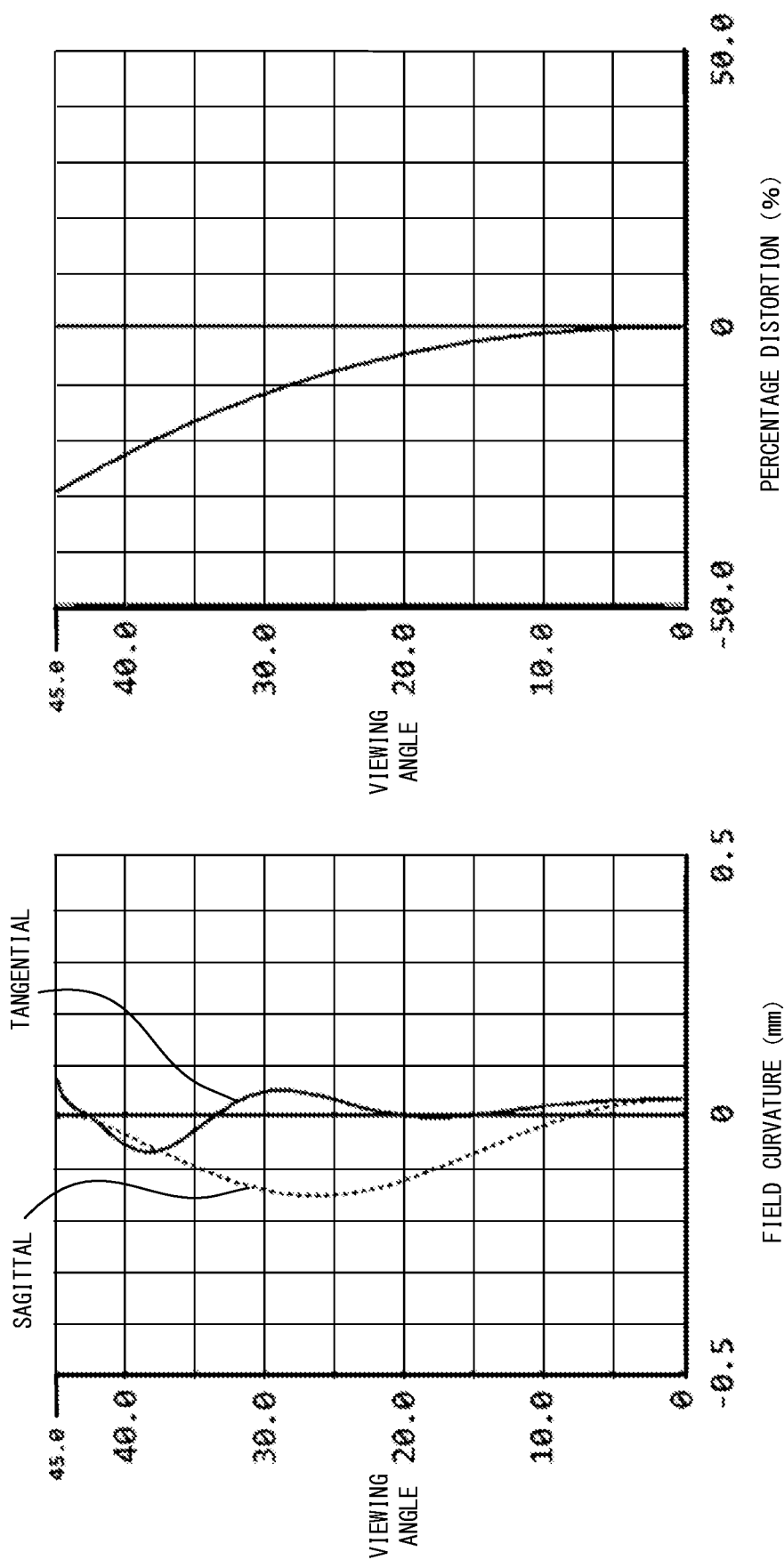
FIG. 8 is a diagram illustrating a graph showing a relationship between a field curvature and a viewing angle and a graph showing a relationship between percentage distortion and a viewing angle, according to Embodiment 1.

As indicating the performance of the ocular optical system OC according to Embodiment 1, a graph showing the relationship between a focal point movement and an absolute value of an optical transfer function (OTF) is illustrated in FIG. 7, and a graph showing the relationship between a field curvature and a viewing angle and a graph showing the relationship between percentage distortion and a viewing angle are illustrated in FIG. 8. Note that the graph illustrated in FIG. 7 shows a case where a spatial frequency is 40 cycle/mm, a wavelength is 525 μm, a pupil diameter is 4 mm, and a pupil position is 15 mm.

The graph illustrated in FIG. 8 shows a case where a pupil position is 15 mm. Both graphs show that the resolution performance of the ocular optical system OC according to Embodiment 1 is excellent.

Embodiment 2

Figure 9:
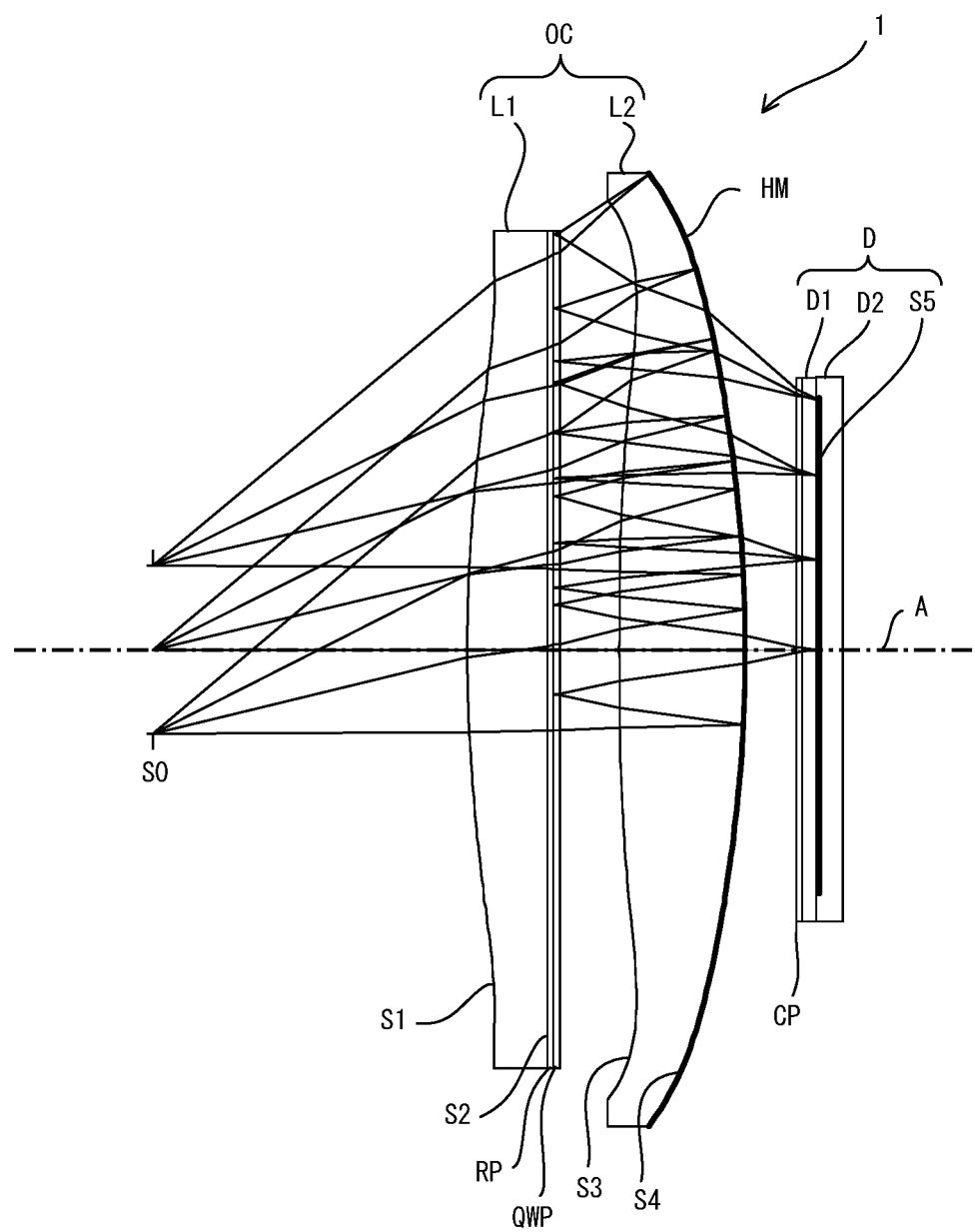
FIG. 9 is a diagram illustrating a configuration of a wide-field video display apparatus according to Embodiment 2.
Figure 10:
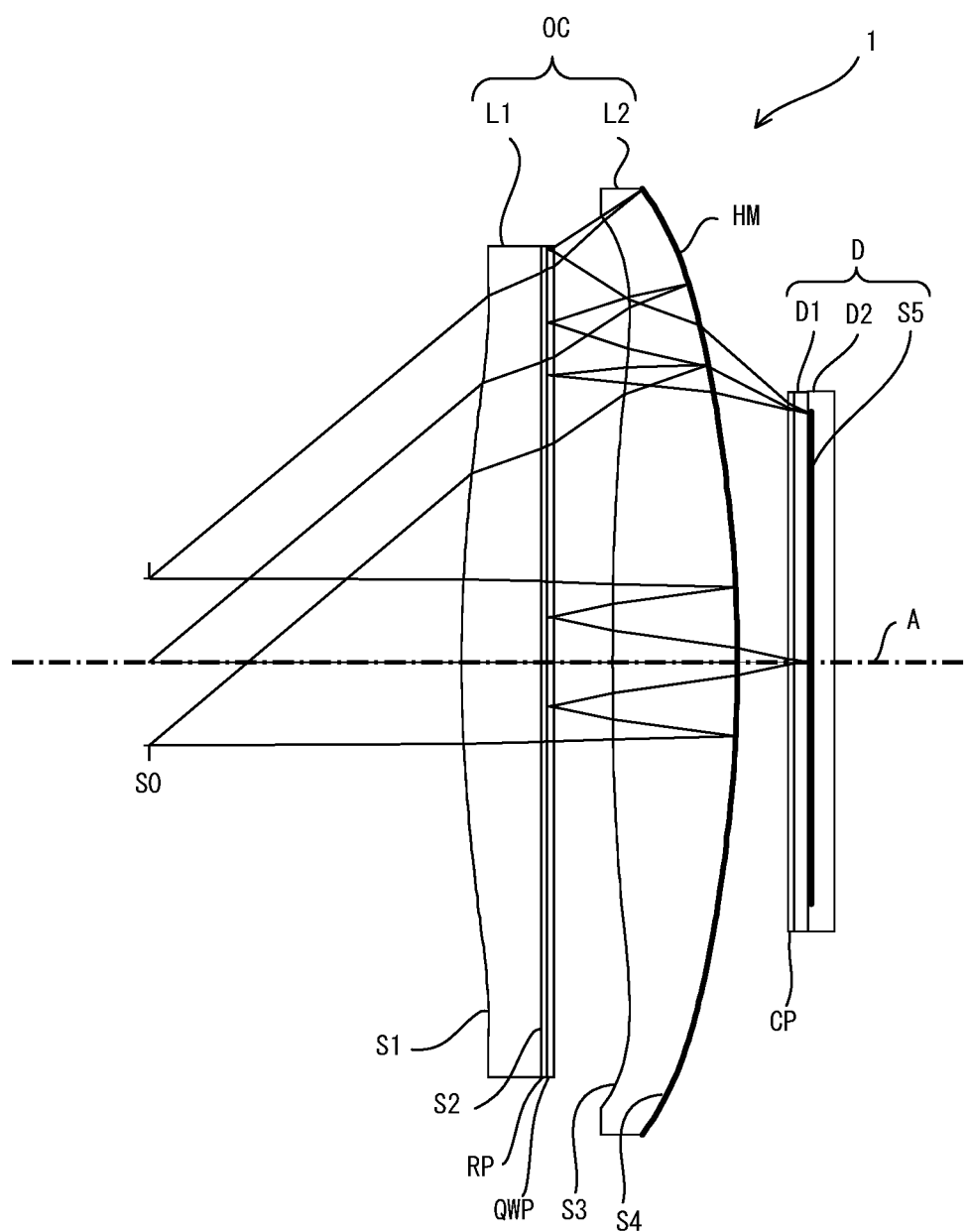
FIG. 10 is a diagram illustrating a normal optical path according to Embodiment 2.
Figure 11:
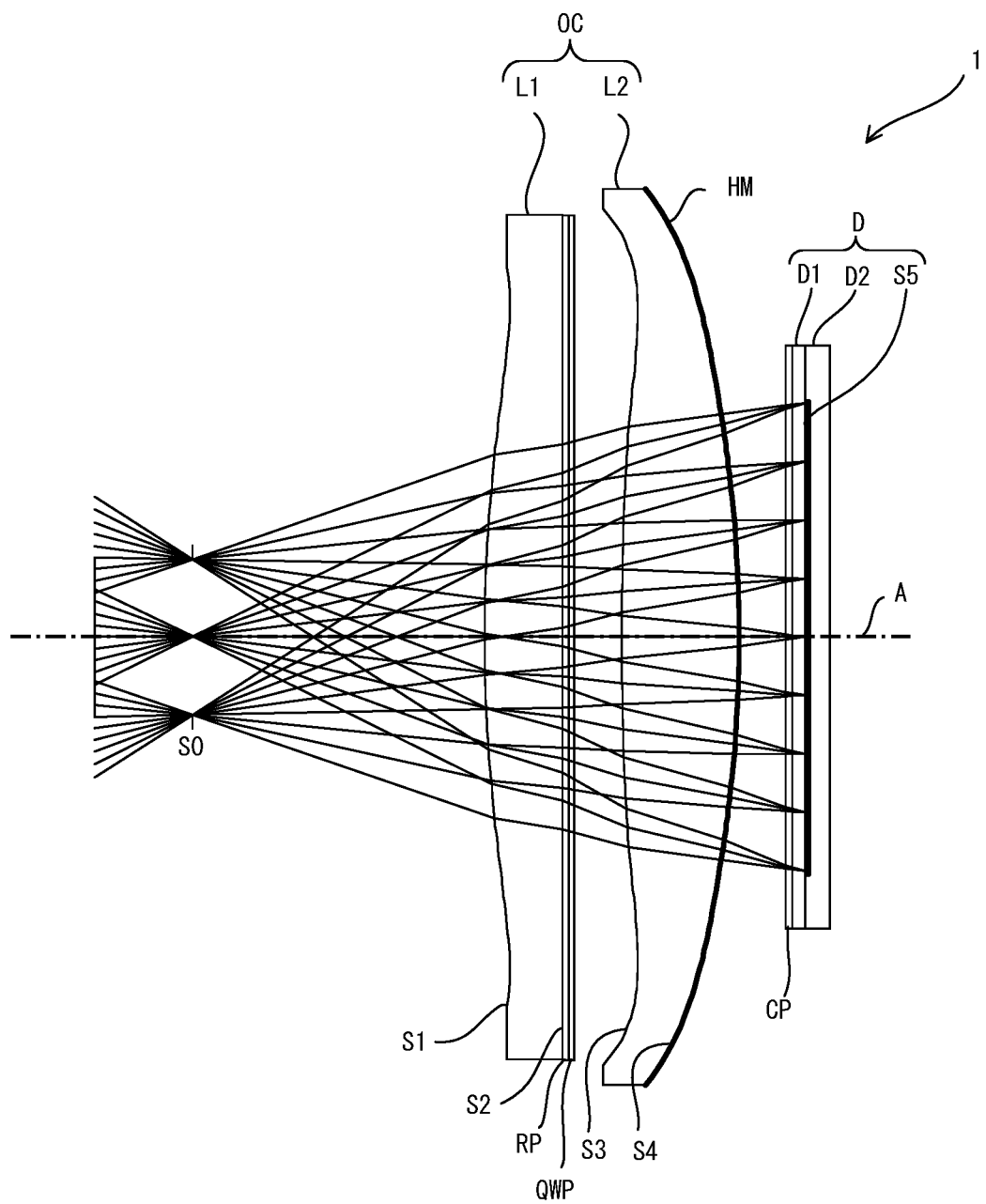
FIG. 11 is a diagram illustrating a straight optical path that may generate a ghost, according to Embodiment 2.
Figure 12:
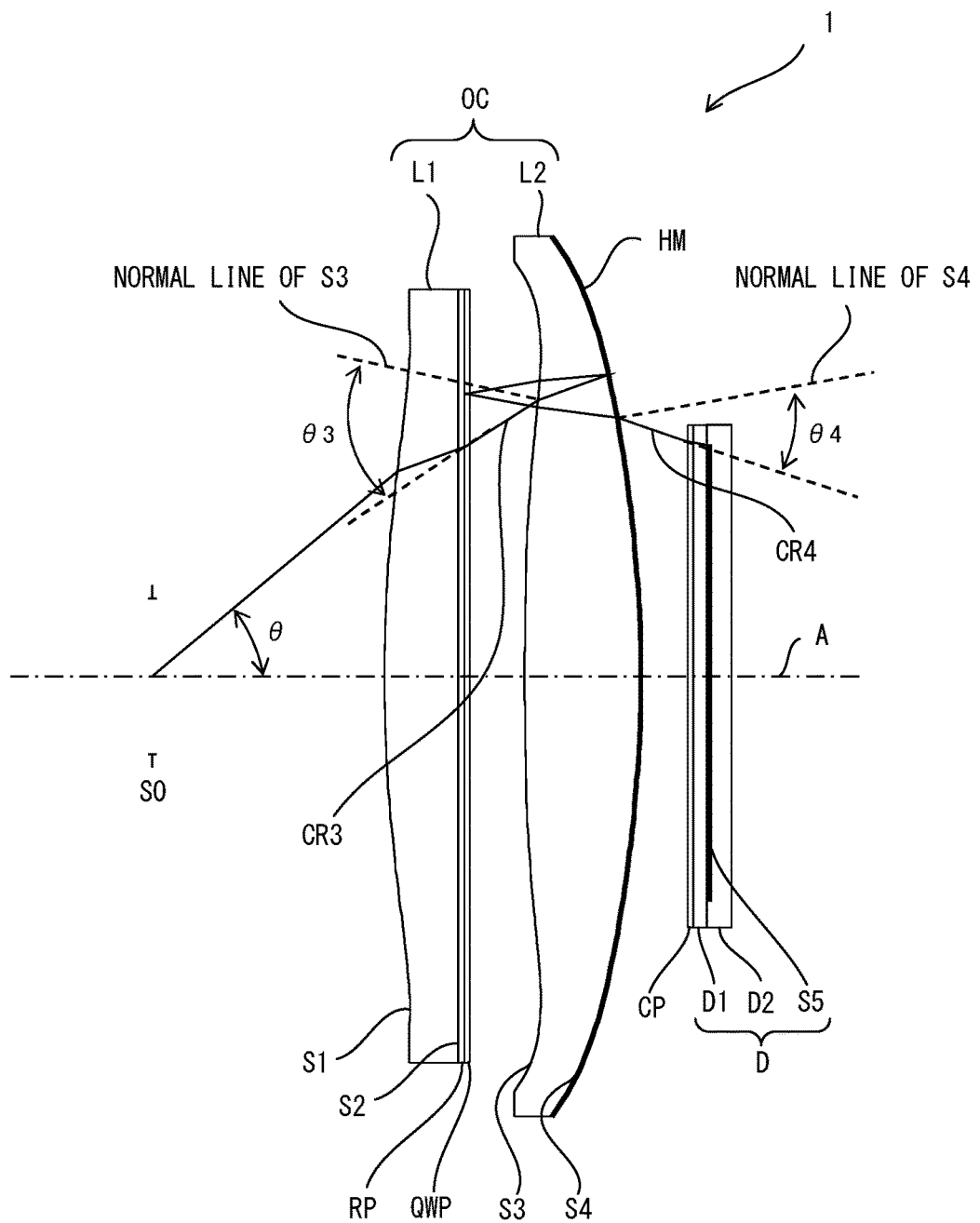
FIG. 12 is a diagram illustrating a chief ray that travels at an inclination θ with respect to an optical axis A after passing through a pupil plane S0, in Embodiment 2.

FIG. 9 is a diagram illustrating a configuration of a wide-field video display apparatus 1 according to Embodiment 2. FIG. 10 is a diagram illustrating a normal optical path according to Embodiment 2. FIG. 11 is a diagram illustrating a straight optical path that may generate a ghost, according to Embodiment 2. FIG. 12 is a diagram illustrating a chief ray that travels at an inclination θ with respect to an optical axis A after passing through a pupil plane S0, in Embodiment 2.

In the wide-field video display apparatus 1 according to Embodiment 2, as illustrated in FIG. 9, the third surface S3 of the second lens L2 is approximately planar around the optical axis A. The normal optical path is an optical path as illustrated in FIG. 10 (and FIG. 9), and the straight optical path that may generate a ghost is an optical path as illustrated in FIG. 11. A chief ray that travels at an inclination θ (40°) with respect to the optical axis A after passing through the pupil plane S0 is as illustrated in FIG. 12.

FIG. 13 is a diagram illustrating a configuration table related to an optical system of the wide-field video display apparatus 1 according to Embodiment 2. FIG. 14 is a diagram illustrating coefficients of an aspherical equation according to Embodiment 2.

In the configuration table illustrated in FIG. 13, the sag of each aspherical surface can be obtained by the aspherical equation of the above-described expression (23).

Here, coefficients k, a, b, c, d, and e with respect to each aspherical surface are as shown in FIG. 14.

In the wide-field video display apparatus 1 according to Embodiment 2, P0, P1, P2, PW3, and PW4R are as follows.
 P0: 0.0542 (unit: 1/mm)
 P1: 0.0081 (unit: 1/mm)
 P2: 0.0510 (unit: 1/mm)
 PW3: 0.001976 (unit: 1/mm)
 PW4R: 0.044283 (unit: 1/mm)
Here, $$P2=0.94\times P0,$$

$$|P1|=0.16\times P2, \text{ and}$$

the above-described expressions (1) and (2) are satisfied, and the above-described expression (4) is also satisfied.

In addition, here, P2 is 0.06 (unit: mm) or less, and from each value of PW3 and PW4R, a surface around the optical axis A in the third surface S3 is an approximately planar surface satisfying the above-described expression (3).

The material of the second lens L2 is Optimas (registered trademark) 7500 made by MITSUBISHI GAS CHEMICAL COMPANY, INC. in the same manner as in Embodiment 1, and the above-described expressions (6) and (7) are also satisfied.

In the wide-field video display apparatus 1 according to Embodiment 2, FOV, DD, Dis, θ3, and θ4 are as follows.
 FOV: 80°
 DD: 12.0 mm
 Dis: −24%
 θ3: 38.4°
 θ4: 28.3°

Here, DD is 12.0 mm, and from the effective diameter of the second lens L2 in the configuration table shown in FIG. 13, the above-described expression (5) is also satisfied.

In addition, θ3 is 38. 4° and θ4 is 28.3°, and the above-described expression (9) is not satisfied, whereas the above-described expression (8) is satisfied.

Figure 15:
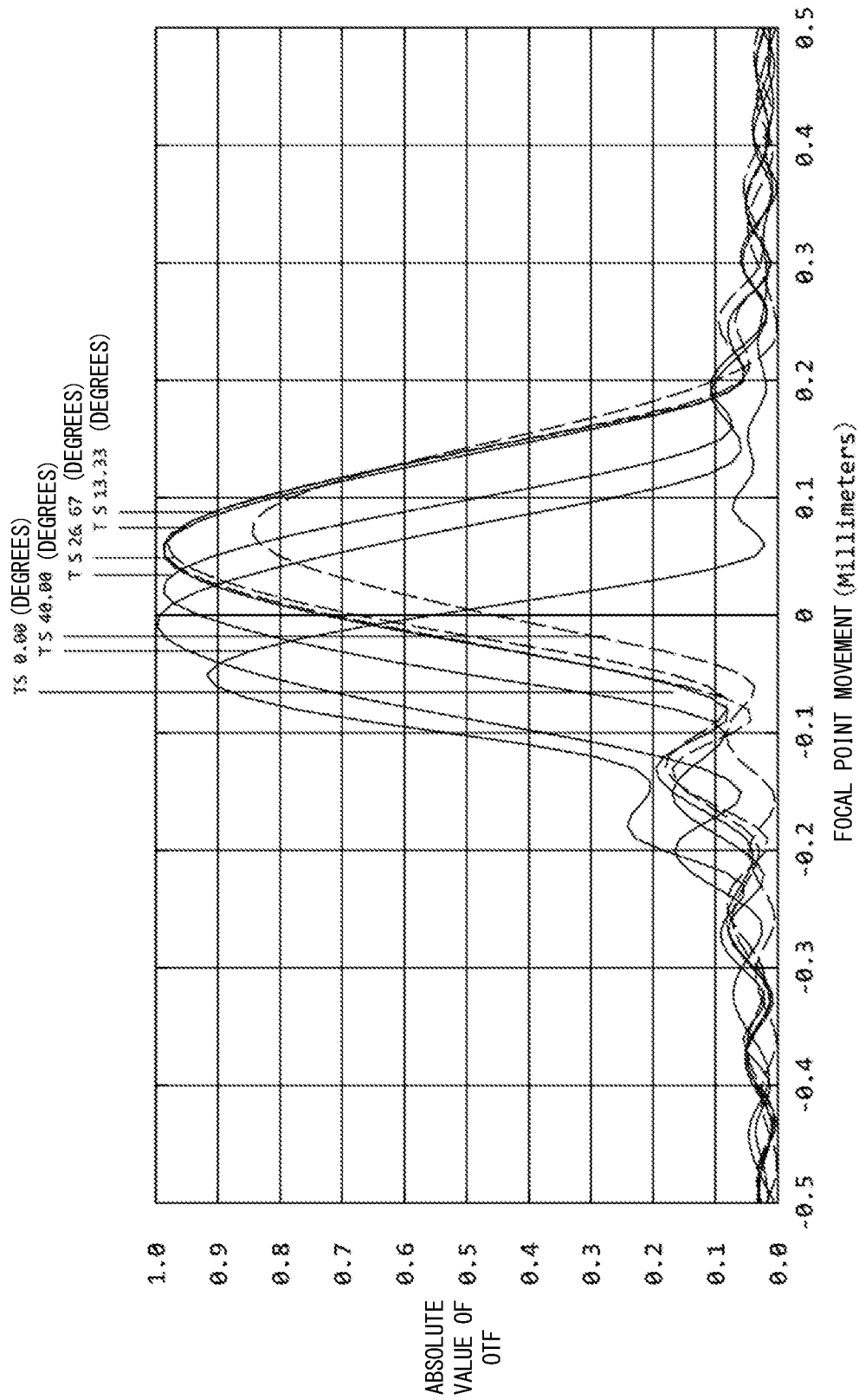
FIG. 15 is a diagram illustrating a graph showing a relationship between a focal point movement and an absolute value of OTF, according to Embodiment 2.
Figure 16:
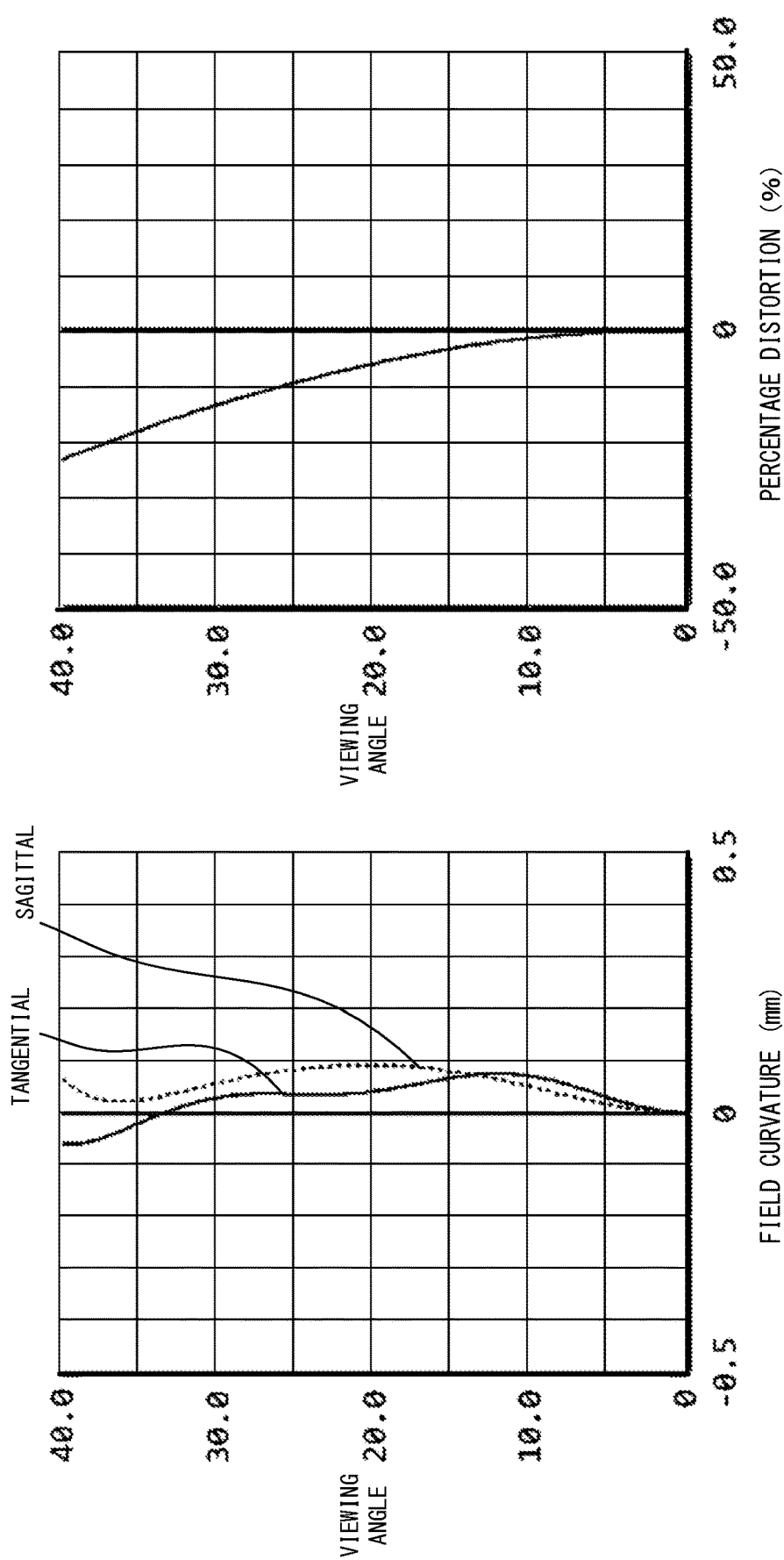
FIG. 16 is a diagram illustrating a graph showing a relationship between a field curvature and a viewing angle and a graph showing a relationship between percentage distortion and a viewing angle, according to Embodiment 2.

As indicating the performance of the ocular optical system OC according to Embodiment 2, a graph showing the relationship between a focal point movement and an absolute value of an OTF is illustrated in FIG. 15, and a graph showing the relationship between a field curvature and a viewing angle and a graph showing the relationship between percentage distortion and a viewing angle are illustrated in FIG. 16. Note that the graph illustrated in FIG. 15 shows a case where a spatial frequency is 40 cycle/mm, a wavelength is 525 μm, a pupil diameter is 4 mm, and a pupil position is 15 mm. The graph illustrated in FIG. 16 shows a case where a pupil position is 15 mm. Both graphs show that the resolution performance of the ocular optical system OC according to Embodiment 2 is excellent.

As described above, the present invention is not limited to these embodiments, and may be embodied in actual implementation by modifying structural elements within the scope of the gist of the embodiments. It is also possible to form various inventions by suitably combining the plurality of structural elements disclosed in the above-described embodiments. For example, it is possible to omit some of the structural elements shown in the embodiments. It is also possible to suitably combine structural elements from different embodiments.

REFERENCE SIGNS LIST

1 Wide-field video display apparatus
OC Ocular optical system
CP Circular polarizing plate
A Optical axis
D Display device
D1 Cover glass
D2 Display device substrate
L1 First lens
L2 Second lens
RP Reflective polarizing plate
QWP ¼-wavelength plate
HM Half mirror
S0 Pupil plane
S1 First surface
S2 Second surface
S3 Third surface
S4 Fourth surface
S5 Video display surface
CR3, CR4 Chief ray

What is claimed is:

1. A look-in type wide-field video display apparatus, comprising:
an ocular optical system; a circular polarizing plate; and a display device positioned in order from a user's eye side,
wherein the ocular optical system includes a first lens and a second lens positioned in order from the user's eye side,
a first surface that is a surface on the user's eye side in the first lens is aspherical,
a second surface that is a surface on a display device side in the first lens is planar or approximately planar, and a reflective polarizing plate and a ¼-wavelength plate are laminated on the second surface in this order from the user's eye side,
a third surface that is a surface on the user's eye side in the second lens is aspherical, and is convex toward the user's eye side around an optical axis of the ocular optical system or is approximately planar around the optical axis,
a fourth surface that is a surface on the display device side in the second lens is aspherical convex toward the display device side and is coated with a half mirror, and
when power of the ocular optical system is represented as P0, power of the first lens is represented as P1, and power of the second lens with respect to video light traveling along a normal optical path after being emitted from the display device is represented as P2, $0.8 \times P0 \leq P2 \leq 1.2 \times P0$, and $|P1| < ¼ \times P2$ are satisfied.

2. The wide-field video display apparatus according to claim 1, wherein
the circular polarizing plate is laminated on the display device or is positioned in a space between the ocular optical system and the display device.

3. The wide-field video display apparatus according to claim 1, wherein
when a maximum size of a video displayed on a video display surface of the display device is represented as DD, and an effective diameter of the second lens is represented as ED, $DD < 0.8 \times ED$ is satisfied.

4. The wide-field video display apparatus according to claim 1, wherein
a refractive index Nd and an abbe number Vd of the second lens satisfy $Nd < 1.65$, and $Vd > 50$.

5. The wide-field video display apparatus according to claim 4, wherein
a material of the second lens is a resin material.

6. The wide-field video display apparatus according to claim 1, wherein
the power P0 (unit: 1/mm) of the ocular optical system satisfies $0.05 < P0 < 0.075$.

7. The wide-field video display apparatus according to claim 1, wherein
when, assuming that a position of a pupil plane is a position of 12 mm toward the user's eye side from the first surface, a chief ray that travels at an inclination θ with respect to the optical axis after passing through the pupil plane is reversely traced from the pupil plane toward the first surface, the chief ray that first enters the third surface is inclined in a direction away from the optical axis toward a traveling direction, and the chief ray emitted from the fourth surface is inclined in a direction approaching the optical axis toward the traveling direction.

8. The wide-field video display apparatus according to claim 7, wherein
in a case where θ is 40°,
when an incident angle of the chief ray that first enters the third surface with respect to the third surface is represented as θ3, and an exit angle of the chief ray that is emitted from the fourth surface with respect to the fourth surface is represented as θ4, $|θ3| > 30°$, and/or $|θ4| > 30°$ are satisfied.

9. The wide-field video display apparatus according to claim 2, wherein
when a maximum size of a video displayed on a video display surface of the display device is represented as DD, and an effective diameter of the second lens is represented as ED, $DD < 0.8 \times ED$ is satisfied.

10. The wide-field video display apparatus according to claim 2, wherein
a refractive index Nd and an abbe number Vd of the second lens satisfy $Nd < 1.65$, and $Vd > 50$.

11. The wide-field video display apparatus according to claim 2, wherein the power P0 (unit: 1/mm) of the ocular optical system satisfies $0.05 < P0 < 0.075$.

12. The wide-field video display apparatus according to claim 2, wherein when, assuming that a position of a pupil plane is a position of 12 mm toward the user's eye side from the first surface, a chief ray that travels at an inclination θ with respect to the optical axis after passing through the pupil plane is reversely traced from the pupil plane toward the first surface, the chief ray that first enters the third surface is inclined in a direction away from the optical axis toward a traveling direction, and the chief ray emitted from the fourth surface is inclined in a direction approaching the optical axis toward the traveling direction.

\* \* \* \* \*